July 20, 1954    C. G. GERLACH    2,684,419
MERCURY SAFETY SWITCH FOR VEHICLES
Filed March 11, 1952    2 Sheets-Sheet 1

INVENTOR
CLARENCE G. GERLACH

BY
McMorrow, Berman + Davidson
ATTORNEYS

July 20, 1954  C. G. GERLACH  2,684,419
MERCURY SAFETY SWITCH FOR VEHICLES
Filed March 11, 1952  2 Sheets-Sheet 2
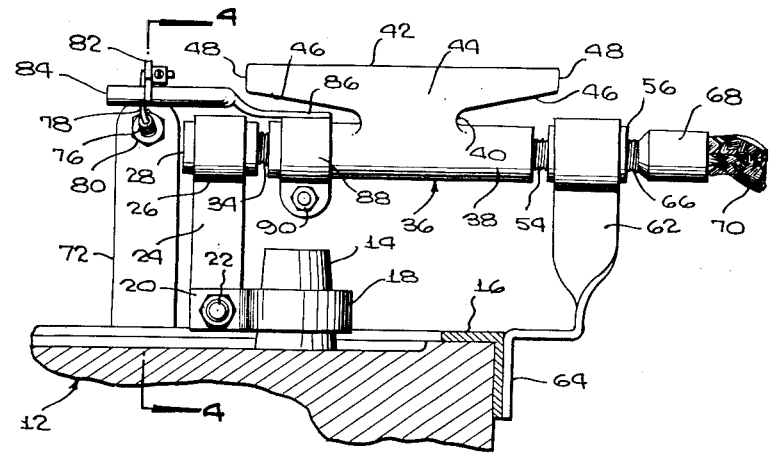
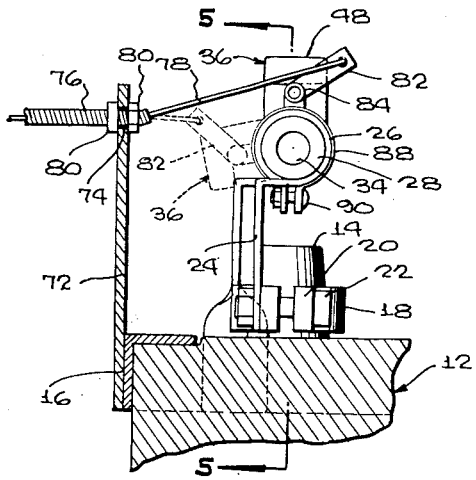
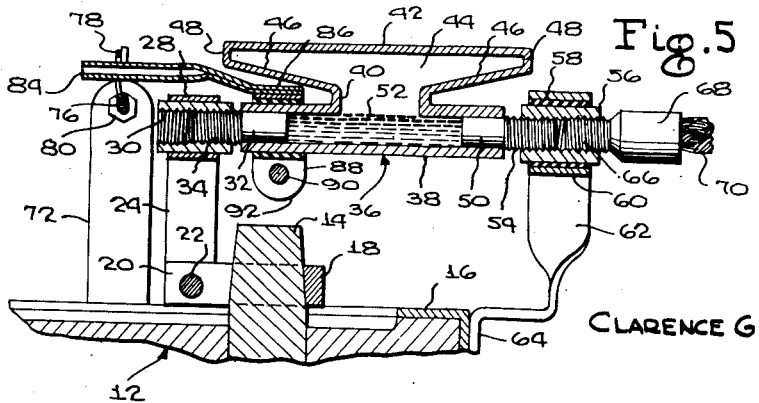
INVENTOR
CLARENCE G. GERLACH
BY
McMorrow, Berman + Davidson
ATTORNEYS Patented July 20, 1954

2,684,419

UNITED STATES PATENT OFFICE 2,684,419

MERCURY SAFETY SWITCH FOR VEHICLES

Clarence G. Gerlach, Versailles, Ohio

Application March 11, 1952, Serial No. 275,978

2 Claims. (Cl. 200—161)

This invention relates to electrical switches, and more particularly, has reference to an electrical switch of the mercury type, adapted particularly as a safety switch for vehicles such as automobiles, trucks, tractors, and the like.

It is well appreciated that under emergency conditions such as those occasioned by a vehicle accident, it is desirable that the vehicle ignition be in its "off" position. For example, when a vehicle overturns, fire may result if the ignition is not cut off, adding to the danger of the vehicle passengers and others in the immediate vicinity.

Further, in a vehicle such as a tractor or bulldozer, use of the vehicle on an incline often causes serious accidents, by reason of the vehicle tilting dangerously and falling on its side or rearing up in such a way as to crush the operator.

In view of the above, it is the broad object of the present invention to provide an improved mercury safety switch for vehicles, said switch being novelly formed in a manner that will permit the operator to control the same manually under emergency conditions, so as to effect instantaneous opening of the electrical circuit of the vehicle when an accident is imminent, it being a further important object of the present invention to so form the switch as to cause the switch to automatically effect opening of the circuit when the vehicle tilts dangerously or overturns.

Another important object is to provide a switch of the character referred to which can be mounted in a vehicle without requiring the modification or redesigning thereof, thus to permit the manufacture and sale of the switch as a separate attachment capable of easy installation in existing vehicles.

Still another important object is to provide a mercury switch as described that will be so formed as to cause an electrical circuit to be closed therethrough under all normal operating conditions.

Yet another important object of the present invention is to provide a mercury switch as stated which can be manufactured at relatively low cost, will be substantially trouble free in operation, and will be of rugged and durable construction.

Other objects will appear from the following description, the claims appended thereto, and from the annexed drawing, in which like reference characters designate like parts throughout the several views, and wherein:

Figure 3 is a view taken on line 3—3 of Figure 2;

Figure 4 is a sectional view taken on line 4—4 of Figure 3; and

Figure 5 is a longitudinal sectional view through the switch, taken substantially on line 5—5 of Figure 4.

Figure 1:
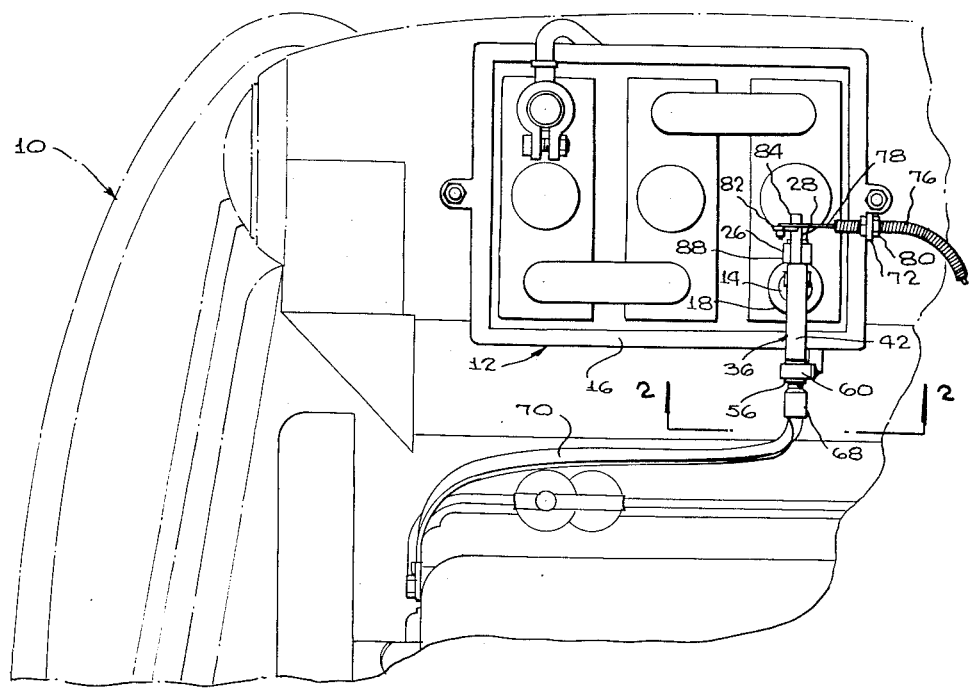
Figure 1 is a top plan view of a switch formed in accordance with the present invention, as it appears when mounted in an automobile, said automobile being illustrated fragmentarily.

Referring to the drawings in detail, the reference numeral 10 designates generally a vehicle in which a switch formed in accordance with the present invention is adapted to be mounted. By way of example, an automobile has been illustrated, but it should be understood at this point that the switch is adapted for mounting on various other types of automotive vehicles, such as tractors, bulldozers, etc.

The vehicle 10 is equipped with the usual battery 12, said battery having a ground post 14 and being held in proper position by means of a conventionally formed hold-down clamp 16.

In accordance with the present invention, a conventional clamp 18 is clamped about the ground post 14, and carries spaced ears 20 apertured for extension therethrough of a clamping bolt 22.

Carried by one of the ears 20 and extending upwardly therefrom is a bracket 24 carrying, at its upper end, with a sleeve 26 in which is supported a bushing 28 having internal threads 30.

The clamp 18, bracket 24, sleeve 26, and bushing 28 are all formed of electrically conductive material, and threadedly engaged in said bushing is an electrically conductive trunnion 32.

Secured as at 64 to the hold down clamp 16 and extending upwardly therefrom is a bracket 62 carrying at its upper end a sleeve 60 which aligns axially with the sleeve 26 and extending through the sleeve 60 is a bushing 58 of nonconducting material. An internally screw threaded bushing 56 of electrically conductive material is secured within the sleeve 60 in electrically isolated relation thereto and threadedly engaged with the bushing 56 and extending toward the trunnion 32 in axial alignment therewith is a trunnion 50 of electrically conductive material.

Mounted on the trunnions 32 and 50 and electrically isolated therefrom is a tubular housing 36 which defines an elongated chamber 38 in which is contained a pool 52 of mercury which normally establishes electrical communication between the trunnions 32 and 50. Extending through the tubular housing substantially midway between the trunnions is an opening and projecting outwardly from said housing 36 in registration with said opening is a collar which defines a neck 40 through which the mercury 52 is discharged when the housing is rotated about the trunnions 32 and 50.

Carried by the neck 40 and extending outwardly therefrom remote from the tubular housing 36 is a hollow body 42 defining a reservoir 44 for the mercury discharged through the neck 40 when the housing 36 is inverted about the trunnions 32 and 50. The walls 46 of the body 42 are inclined toward the housing 36 as they approach the neck 40 so that when the device is returned to its normal position in which the chamber 44 lies above the housing 36, all of the mercury will drain into the housing 36.

The bracket 62, at its lower end, is formed with an angular portion 64, that is rigidly connected to the hold-down clamp 16 by any suitable means.

Threadedly engaged in the other end of the bushing 56 is the externally threaded inner end 66 of a battery cable clamping sleeve 68, in which is received one end of the battery ground cable 70.

By reason of the construction so far illustrated and described, it will be seen that normally, a circuit is closed to the ground post 14 of the battery 12, from the battery ground cable 70, the electrical current flowing through the sleeve 68, bushing 56, trunnion 50, mercury 52, trunnion 32, bushing 28, bracket 24, and clamp 18.

Further, from the construction so far illustrated and described, it is apparent that although the mercury 52 is normally housed within the tubular housing 36 and bridges the trunnions 32, 50, rotation of the tubular housing about the trunnions to a position in which the reservoir 44 lies below the tubular housing will result in the flow of the mercury out of the tubular housing and its terminal bridging position into the reservoid 44.

Means is provided for permitting manual control of the mercury housing position from a remote location, such as the interior of the vehicle, and to this end, an upstanding support 72 is fixedly secured in any suitable manner to the hold-down clamp 16. At its upper end, the support 72 is formed with an opening 74, through which a cable housing 76 extends, said housing having a flexible steel cable 78 therein. The housing 76 is clamped to the support 72 by means of lock nuts 80, that are threadable upon the housing 76 against the opposite faces of said support.

The cable 78 is pivotally connected, at one end, to the outer end of a swingable arm 82, said arm being rigidly secured at its inner end to an elongated tube 84 (Figure 5), that projects beyond one end of the mercury housing and is disposed in parallelism with the main portion 38 of said housing. The tube 84 is flattened at one end as at 86, the end 86 being offset from the main axis of the tube and being fixedly secured to a split clamp 88, that extends about one end of the main chamber 38. The clamp 88 has spaced ears apertured for the extension therethrough of a clamping bolt 90, said clamping bolt being adapted, when tightened, to cause the clamp to be fixedly engaged with the main portion of the mercury housing. Insulation 92 is provided, to insulate the flattened end 86 and clamp 88 from the end of the chamber 38 about which the clamp 88 is circumposed.

Figure 2:
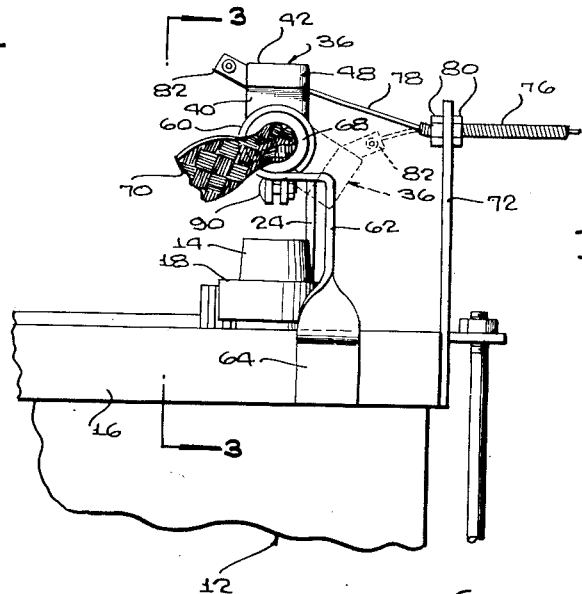
Figure 2 is an enlarged sectional view taken on line 2—2 of Figure 1.

It will be readily appreciated that the other end of the cable 78 can be extended to the control panel of the automotive vehicle, and operated by means of a knob located on said panel, so that the user of the vehicle can control the position of the mercury housing 36 by push-pull operation of said knob. In other words, under normal conditions, the parts will be positioned as shown in full lines in the several figures of the drawings. Assuming, however, that the operator of the vehicle finds the vehicle tilting dangerously or notes other emergency conditions, said operator will merely pull the control knob, so as to swing the parts to the dotted line positions shown in Figures 2 and 4. This will cause the mercury to flow into the reservoir 44, thereby opening the ignition circuit.

Further, it is an important characteristic of the invention that manual operation is not necessary, in every instance. Thus, if an accident occurs during which the vehicle overturns, the reservoir 44 will be automatically tilted to a position in which it will receive the mercury 52, thus shutting off the ignition automatically. This is important if, for example, a tractor, bulldozer, or like vehicle tilts dangerously and tips over without warning.

What is claimed is:

1. A safety switch for a vehicle comprising trunnions of conducting material mounted on a vehicle in longitudinally spaced relation along a common axis, a tubular body mounted on the trunnions for rotation about the common axis, said body being electrically isolated from the trunnions, a liquid conductor within the tubular body for establishing electrical communication between the trunnions, a reservoir carried by the tubular body adjacent one side thereof, said reservoir communicating with the tubular body midway between the trunnions for receiving the liquid conductor when the tubular body is rotated about the common axis, and manually controlled means carried by the vehicle and operatively connected to the tubular body for rotating it.

2. A safety switch for a vehicle comprising trunnions of conducting material mounted on a vehicle in longitudinally spaced relation along a common axis, a tubular body mounted on the trunnions for rotation about the common axis, said body being electrically isolated from the trunnions, a liquid conductor within the tubular body for establishing electrical communication between the trunnions, a reservoir carried by the tubular body adjacent one side thereof, said reservoir communicating with the tubular body midway between the trunnions for receiving the liquid conductor when the tubular body is rotated about the common axis, manually controlled means carried by the vehicle and operatively connected to the tubular body for rotating it, and the walls of the reservoir adjacent the tubular body inclining toward the tubular body as they recede from opposite ends of the reservoir.

References Cited in the file of this patent

UNITED STATES PATENTS

| Number | Name | Date |
|---|---|---|
| 1,256,380 | Schmidt | Feb. 12, 1918 |
| 1,381,020 | Schaub et al. | June 7, 1921 |
| 1,861,800 | Janisch | June 7, 1932 |
| 1,995,946 | Schild | Mar. 26, 1935 |
| 2,519,815 | Beane | Aug. 22, 1950 |